United States Patent [19]

Kendall, deceased et al.

[11] Patent Number: 5,143,955

[45] Date of Patent: Sep. 1, 1992

[54] POLYPHENYLENE ETHER-HIGH IMPACT POLYSTYRENE BLENDS HAVING IMPROVED FLAMMABILITY PERFORMANCE

[75] Inventors: Ronald Kendall, deceased, late of NL Voorhout, Netherlands, by Karen Kendall, executrix; Ronald H. Place, Vincent, Ohio; Renate I. Warren, Coolville, Ohio

[73] Assignee: Borg-Warner Chemicals, Inc., Parkersburg, W. Va.

[21] Appl. No.: 706,444

[22] Filed: May 28, 1991

Related U.S. Application Data

[63] Continuation of Ser. No. 82,337, Aug. 6, 1987, abandoned.

[51] Int. Cl.$^5$ ............ C08K 5/03; C08K 5/51; C08K 71/12

[52] U.S. Cl. ............... 524/151; 524/341; 525/68; 525/92; 525/905

[58] Field of Search ............. 7/82; 525/68, 92, 905; 524/151, 341

[56] References Cited

U.S. PATENT DOCUMENTS 4,350,793  9/1982  Schmidt et al. ............ 525/905
4,448,931  5/1984  Sugro et al. ............... 525/905

Primary Examiner—Jacob Ziegler
Attorney, Agent, or Firm—Lowe, Price, LeBlanc & Becker

[57] ABSTRACT

Polymer blend compositions having improved flammability performance comprise a polyphenylene ether resin, a high impact polystyrene resin, a flame retardant and a high molecular weight polystyrene resin having a weight average molecular weight, Mw, greater than about 400,000.

17 Claims, No Drawings

POLYPHENYLENE ETHER-HIGH IMPACT POLYSTYRENE BLENDS HAVING IMPROVED FLAMMABILITY PERFORMANCE

This application is a continuation of application Ser. No. 07/082,337 filed Aug. 6, 1987, now abandoned.

FIELD OF THE INVENTION

The present invention relates to polymer blend compositions having improved flammability performance, and more particularly, to polyphenylene ether-high impact polystyrene polymer blend compositions having improved flammability performance.

BACKGROUND OF THE INVENTION

Polyphenylene ether resins are known in the art and exhibit a desirable combination of chemical, physical and electrical properties over a temperature range of more than about 650° F., extending from a brittle point of about −275° F. to a heat distortion temperature of about 375° F. This combination of properties renders polyphenylene ether resins suitable for a broad range of applications. However, the usefulness of polyphenylene ether resins is limited in some applications as a consequence of processability, impact resistance, and chemical resistance.

As a result, polyphenylene ether resins have been blended with other polymer resins in order to improve processibility, impact resistance and chemical resistance. For example, the Cizek U.S. Pat. No. 3,383,435 discloses blends of polyphenylene ether and one or more styrene resins having improved properties. Additionally, the Lee U.S. Pat. No. 3,819,761 discloses compositions comprising a polyphenylene ether and a rubber modified polystyrene resin, which compositions provide molded articles exhibiting improvements in impact resistance, surface appearance and solvent resistance. Similarly, the Lee, Jr. U.S. Pat. No. 3,835,200 discloses compositions including a polyphenylene ether, a rubber styrene graft copolymer and a block copolymer of a vinyl aromatic compound and a conjugated diene, which compositions may be used to form molded articles having improved toughness without impairing the gloss or surface appearance of the articles. The Katchman U.S. Pat. No. 3,960,808 discloses polyphenylene ether compositions including a rubber-modified high impact styrene resin and a homopolystyrene having a number average molecular weight between 30,000 and 60,000. These compositions are disclosed as having improved surface appearance and a reduced melt viscosity which facilitates the fabrication of molded articles having complex configurations and permits the use of faster molding cycles. Similarly, the Katchman et al U.S. Pat. No. 3,994,856 discloses compositions including a polyphenylene ether, a high impact rubber modified polystyrene resin or a blend of a high impact rubber modified polystyrene resin and a homopolystyrene resin, and an elastomeric block copolymer of a vinyl aromatic compound and a conjugated diene. These compositions are disclosed as having improved impact strengths and improved resistance to attack by aggressive solvents such as gasoline.

Additionally, the Sonoda U.S. Pat. No. 4,617,346, the Sugio et al U.S. Pat. No. 4,590,239 and the Yonemitsu et al U.S. Pat. No. 3,887,646 disclose polyphenylene ether resin compositions including rubber modified styrene polymers for improving impact resistance, heat resistance and the like. Additional polyphenylene ether and polystyrene resin blends are disclosed in the Izawa et al U.S. Pat. No. 3,929,931, the Haaf U.S. Pat. No. 4,322,507, the Kuribayashi et al U.S. Pat. No. 4,543,391 and the Ueda et al U.S. Pat. No. 4,599,380.

One limitation which has been experienced in polyphenylene ether-polystyrene polymer blends is that their flame retardant properties are insufficient. Particularly, many polyphenylene ether-polystyrene bends cannot pass flammability tests such as the oxygen index, UL 94 V or the UL 94 5V tests because of material dripping. The UL tests are standard test procedures of the Underwriters Laboratory. The poor flammability performance of such polyphenylene ether-polystyrene blends prevents the use of such blends in applications which require improved flammability performance. Thus, a need exists for polyphenylene ether-polystyrene blends which exhibit improved flammability performance.

SUMMARY OF THE INVENTION

Accordingly, it is an object of the present invention to provide polymer blend compositions comprising a polyphenylene ether resin and a high impact polystyrene resin. It is an additional object of the invention to provide polyphenylene ether-high impact polystyrene polymer blends which exhibit improved flammability performance over known polyphenylene ether-high impact polystyrene blends. Another object of the present invention is to provide polyphenylene ether-high impact polystyrene polymer blends which are flame retardant. A specific object of the present invention is to provide polyphenylene ether-high impact polystyrene polymer blends which exhibit improved flammability performance as measured by, for example, the oxygen index, UL 94 V and/or UL 94 5V tests.

These and additional objects are provided by the polymer blend compositions according to the present invention which comprise a polyphenylene ether resin, a high impact polystyrene resin, a flame retardant, and a high molecular weight polystyrene resin having a weight average molecular weight, Mw, greater than about 400,000. In accordance with the present invention, it has been discovered that the flammability performance of polyphenylene ether-high impact polystyrene polymer blends may be significantly improved by further including a high molecular weight polystyrene resin having a weight average molecular weight, Mw, greater than about 400,000. Inclusion of the high molecular weight polystyrene resin having a weight average molecular weight, Mw, greater than about 400,000 provides improved flammability performance to polyphenylene ether-high impact polystyrene polymer blends already including a conventional flame retardant. The high molecular weight polystyrene resin is included in the compositions in an amount sufficient to provide improved flammability performance, preferably, the high molecular weight polystyrene is included in an amount less than the amount in which the high impact polystyrene resin is included in order to retain the advantageous impact properties of the blends.

These and additional objects and advantages of the compositions according to the present invention will be more fully understood in view of the following detailed description.

DETAILED DESCRIPTION

It has now been discovered that the addition of a small amount of a high molecular weight polymer to a polymer blend composition improves the flammability performance of the blend compositions. More particularly, the polymer blend compositions according to the present invention having improved flammability performance comprise a polyphenylene ether resin, a high impact polystyrene resin, a flame retardant and a high molecular weight polystyrene resin having a weight average molecular weight, Mw, greater than about 400,000.

Polyphenylene ether resins adapted for use in the polymer blend compositions of the present invention comprise polymers and copolymers having repeating structural units of the following general formula:

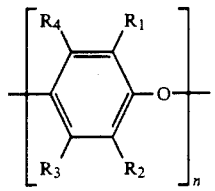

wherein $R_1$, $R_2$, $R_3$, and $R_4$ each individually represent a monovalent substituent such as hydrogen, halogen, alkyl, aryl, alkoxy and other hydrocarbon groups, and n represents the degree of polymerization. Preferably, n is at least 20, and more preferably, n is at least 50.

The polyphenylene ether resins suitable for use in the polymer blend compositions of the present invention are well known in the art and may be prepared by any of a number of processes known in the art from corresponding phenols or reactive derivatives thereof. Examples of polyphenylene ether resins and methods for their production are set forth in the Hay U.S. Pat. Nos. 3,306,874 and 3,306,875 and in the Stamatoff U.S. Pat. Nos. 3,257,357 and 3,257,358, all of which are incorporated herein by reference. Throughout the Specification and Claims the term "polyphenylene ether" includes unsubstituted polyphenylene ether, substituted polyphenylene ether and polyphenylene ether copolymers.

Preferred polyphenylene ether resins adapted for use in the polymer blend compositions of the present invention include, but are not limited to, poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; poly(2,6-dilauryl-1,4-phenylene)ether; poly(2,6-diphenyl-1,4-phenylene)ether; poly(2,6-dimethoxy-1,4-phenylene)ether; poly(2,6-diethoxy-1,4phenylene)ether; poly(2-methoxy-6-ethoxy-1,4phenylene)ether; poly(2-ethyl-6-stearyloxy-1,4-phenylene)ether; poly(2,6-dichloro-1,4-phenylene)ether; poly(2-methyl-6-phenyl-1,4-phenylene)ether; poly(2,6-dibenzyl-1,4-phenylene)ether; poly(2-ethoxy-1,4phenylene)ether; poly(2-chloro-1,4-phenylene)ether; poly(2,6-dibromo-1,4-phenylene)ether; and the like.

The high impact polystyrene resin which is included in the polymer blend compositions according to the present invention comprises a combination of polystyrene and an impact modifier. Specifically, the high impact polystyrene comprises polymer units derived from a styrene monomer having the following formula

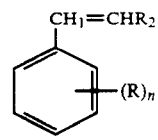

wherein $R_1$ and $R_2$ are selected from the group consisting of lower alkyl or alkenyl groups of from, for example, 1 to 6 carbon atoms and hydrogen, each R is selected from the group consisting of halogen, hydrogen and lower alkyl or alkenyl groups of from, for example, 1 to 6 carbon atoms, and n is an integer of from 0 to 5. Throughout the specification and claims the term "polystyrene resin" includes unsubstituted polystyrene, substituted polystyrene and polystyrene copolymer resins. For example, suitable polystyrene resins include, but are not limited to, homopolymers of polystyrene, polychlorostyrene, polymethylstyrene and the like, and styrene-containing copolymers such as styreneacrylonitrile copolymers, copolymers of ethyl vinyl benzene and divinyl benzene, styrene-acrylonitrilemethylstyrene terpolymers and the like. The methods for preparing these polystyrenes are well known in the art. The polystyrene resin which makes up the high impact polystyrene resin generally has a weight average molecular weight, Mw, of about 250,000 or less.

The impact modifier included in the high impact polystyrene resins according to the present invention serves to improve the impact properties of the blends. Impact modifiers are well known in the art and generally comprise rubber or elastomer compounds. Both natural and synthetic rubber and elastomeric compounds are suitable for use in the high impact polystyrene resin of the present invention. Preferred impact modifiers include homopolymers or copolymers of one or more monomers such as butadiene, isoprene and ethylene-propylene diene monomers. Suitable impact modifiers for use in the present invention include, but are not limited to, hydroxy- and carboxyterminated polybutadienes, poly-chlorobutadienes, copolymers of dienes such as butadiene and isoprene with various comonomers such as alkyl unsaturated esters, for example methylmethacrylate, unsaturated ketones, for example methylisopropenyl ketone, vinyl heterocyclics, for example vinyl pyridine, and the like. Other impact modifiers known in the art may also be used according to the present invention.

Preferably, the impact modifier and the polystyrene resin which are combined to form the high impact polystyrene resin included in the polymer blend compositions of the present invention are combined prior to mixing with the other composition ingredients. Additionally, the polystyrene resin and the impact modifier are preferably combined in a ratio of at least 3:1 by weight to form the high impact polystyrene resin which is then blended with the polyphenylene ether and the remaining composition ingredients.

The flame retardant which is included in the polymer blend compositions of the present invention may comprise many of the flame retardants which are well known in the art for polymer systems. Suitable flame retardants include, but are not limited to, triaryl phosphates such as triphenyl phosphate and isopropyl triphenyl phosphate, and brominated aromatic compounds such as decabromobiphenyl, pentabromophenyl, pentabromotoluene, hexabromobenzene, decabromodiphenyl carbonate and tetrabromophthalic anhydride.

The high molecular weight polystyrene resin which is included in the polymer blend compositions of the present invention has a weight average molecular weight, Mw, greater than about 400,000. The high molecular weight polystyrene resin provides the polymer blend compositions with improved flammability performance. Specifically, the high molecular weight polystyrene resin improves the performance of polyphenylene ether-high impact polystyrene polymer blend compositions in the oxygen index, UL 94 V and/or UL 94 5V tests. In a preferred embodiment, the high molecular weight polystyrene resin has a weight average molecular weight, Mw, greater than 600,000. The high molecular weight polystyrene resin may be linear or branched. At least a small degree of branching may improve certain properties of the compositions, for example, viscosity, and may reduce the amount of high molecular weight polystyrene required to provide improved flammability performance in a blend composition. Additionally, the high molecular weight polystyrene resin preferably comprises a polystyrene homopolymer or a polystyrene copolymer formed from less than 10 weight percent, and more preferably less than 5 weight percent, of a non-styrene monomer. The non-styrene monomer generally comprises a functional monomer which provides the high molecular weight polystyrene with a degree of branching structure.

The amounts of polyphenylene ether resin, high impact polystyrene resin, flame retardant and high molecular weight polystyrene resin included in the polymer blend compositions of the present invention may be varied depending on the specific nature of the high molecular weight polystyrene resin and on the end use of the polymer blend composition. The high molecular weight polystyrene resin is included in an amount sufficient to provide the blends with improved flammability performance. As will be apparent to one skilled in the art, flammability performance may be measured in various manners, including, for example, the oxygen index, UL 94 V and UL 94 5V tests. The high molecular weight polystyrene resin is preferably included in the blends in an amount less than the amount in which the high impact polystyrene resin is included. It is preferred that the high impact polystyrene is included in a greater amount than the high molecular weight polystyrene in order to retain the advantageous properties of the polyphenylene-polystyrene blends. Generally, the high molecular weight polystyrene resin is included at least in an amount of about one weight percent in order to provide the polymer blend composition with the improved flammability performance. Moreover, no more than about 10 weight percent of the high molecular weight polystyrene is usually required in the blends in order to provide improvements in flammability performance. Preferred amounts of the high molecular weight polystyrene are from about 3 to about 8 weight percent. It is believed that relatively lower amounts of the high molecular weight polystyrene may be used if the high molecular weight polystyrene comprises at least a small degree of branching, while, if the high molecular weight polystyrene is linear, relatively greater amounts may be necessary to provide the improved flammability performance.

The polymer blend compositions according to the present invention also preferably comprise from about 5 to about 90 weight percent of the polyphenylene ether resin, from about 5 to about 90 weight percent of the high impact polystyrene resin, and from about 0.1 to about 30 weight percent of the flame retardant. In additionally preferred embodiments, the polymer blend compositions according to the present invention comprise from about 25 to about 70 weight percent of the polyphenylene ether resin, from about 25 to about 70 weight percent of the high impact polystyrene resin, from about 1 to about 20 weight percent of the flame retardant and from about 3 to about 8 weight percent of the high molecular weight polystyrene resin.

The method of forming the polymer blend composition is not critical and prior art blending techniques are suitable. As set forth above, a preferred method comprises first blending the polystyrene resin and the impact modifier and then blending the resultant high impact polystyrene resin with the polyphenylene ether and other components included in the polymer blend composition.

Additionally, conventional amounts of conventional additives for processibility, stability and the like may be included in the polymer blend compositions of the present invention. Fillers and/or reinforcing fillers may also be included in the polymer blend compositions, examples of which include powders, beads, whiskers, fibers or platelets, of metals, for example aluminum, bronze, iron and nickel, and/or nonmetals, for example carbon, calcium silicate, asbestos, titanium dioxide, talc, clay, glass flakes, glass fibers and the like.

The following Examples are provided to illustrate specific embodiments of the present invention.

EXAMPLE 1

In accordance with the present invention, polymer blend compositions were prepared including a polyphenylene ether resin, a high impact polystyrene resin, a flame retardant and a high molecular weight polystyrene. The amounts, in weight percents, of the components included in the compositions are set forth in Table 1. The flame retardant included in the compositions of this Example comprised triphenyl phosphate. The high molecular weight polystyrene comprised a commercially available, linear high molecular weight polystyrene, Celukavit S supplied by C.D.F. Chimie, having a weight average molecular weight, Mw, of approximately $6 \times 10^6$. The compositions of this Example further included approximately 1.4 total weight percent of additional additives comprising a butyl hydroxy toluene antioxidant, an ethylene oxide/propylene oxide copolymer lubricant and an octyldiphenyl phosphite stabilizer. As set forth in Table 1, composition A did not include any of the high molecular weight polystyrene resin while compositions B-F included increasing amounts of the high molecular weight polystyrene resin, respectively. Injection molded bars of the compositions were subjected to the UL 94 5V and oxygen index tests in order to determine flammability performance. In this and the following examples the UL tests were conducted according to the standards of Underwriters Laboratory. The oxygen index test was performed according to ASTM D-2863. Various physical properties of the compositions were also measured including the Notched Izod Impact Strength according to ASTM D-256, method A, the Mobay Viscosity according to a method substantially similar to ASTM D-3835 at 550°

F. and the tensile properties according to ASTM D-639. The results of these tests and measurements are also set forth in Table 1. In the UL 94 5V tests set forth in Table 1, F-5 indicates that the sample failed the test during the fifth ignition, that is, the sample dripped during the fifth ignition. Compositions B-F show improved flammability performance as measured by the oxygen index test, while compositions D-F also exhibited improved flammability performance as measured by the UL 94 5V test. The results set forth in Table 1 further indicate that the physical properties of the polymer blend compositions of the present invention, for example notched Izod impact strength, viscosity and tensile strength, modulus and elongation, were not unreasonably affected by the inclusion of the high molecular weight polystyrene resin in the compositions as compared with the Comparative Composition A.

TABLE 1

| Component, wt % | A | B | C | D | E | F |
|---|---|---|---|---|---|---|
| Polyphenylene Ether | 41.6 | 41.6 | 41.6 | 41.6 | 41.6 | 41.6 |
| High Impact Polystyrene Resin | 41.6 | 39.1 | 38.3 | 37.5 | 36.6 | 35.0 |
| Flame Retardant | 15.4 | 15.4 | 15.4 | 15.4 | 15.4 | 15.4 |
| High Molecular Weight Polystyrene | — | 2.5 | 3.3 | 4.1 | 5.0 | 6.6 |
| Additives | 1.4 | 1.4 | 1.4 | 1.4 | 1.4 | 1.4 |
| UL 94 5V (.125" thick) | F-5 | F-5 | F-5 | PASS | PASS | PASS |
| IZOD IMPACT STRENGTH, ft-lbs/in | 8.4 | 8.2 | 8.0 | 8.2 | 7.4 | 7.5 |
| SPECIFIC GRAVITY | 1.099 | 1.100 | 1.100 | 1.100 | 1.101 | 1.101 |
| OXYGEN INDEX (%) | 28.5 | 30.0 | 31.0 | 31.5 | 31.5 | 33.0 |
| MOBAY VISCOSITY (550° F.) | | | | | | |
| 100 SEC.-1 | 3745 | 4123 | 4062 | 4056 | 4372 | 4448 |
| 500 SEC.-1 | 1772 | 1997 | 2003 | 2008 | 2138 | 2218 |
| 1000 SEC.-1 | 1284 | 1461 | 1477 | 1483 | 1572 | 1644 |
| TENSILE ST., PSI | 5555 | 5823 | 5940 | 5850 | 6250 | 6090 |
| MOD., PSI $\times 10^5$ | 3.5 | 3.5 | 3.6 | 3.3 | 3.4 | 3.5 |
| ELONG., % | 62 | 59 | 62 | 70 | 60 | 59 |

EXAMPLE 2

Polymer blend compositions were prepared comprising a polyphenylene ether, a high impact polystyrene resin, a flame retardant and a high molecular weight polystyrene resin in a manner similar to that set forth in Example 1. The amounts of the components, in weight percents, are indicated in Table 2. The flame retardant included in the polymer blend compositions comprised triphenyl phosphate. The high molecular weight polystyrene comprised the linear Celukavit S set forth in Example 1. Compositions A and B did not include a high molecular weight polystyrene resin in accordance with the present invention. Composition A of this Example also included approximately 2 total weight percent of additives comprising a butyl hydroxy toluene antioxidant, an ethylene oxide/propylene oxide copolymer lubricant, and an octyldiphenyl phosphite stabilizer as described in Example 1 and a substituted hydroxyphenyl benzotriazol UV stabilizer. Compositions B-D included approximately 2.5 total weight percent of additives comprising the aforementioned antioxidant, lubricant and phosphite stabilizer. Injection molded bars of these compositions were subjected to the UL 95 5V test and other tests for measuring physical properties as set forth in Example 1. The compositions were also subjected to the heat distortion temperature test according to ASTM D-696. The results of these tests are set forth in Table 2. Composition D relating to a preferred composition of the present invention including greater than 3 percent by weight of the high molecular weight linear polystyrene successfully passed the UL 95 5V test. Additionally, the physical properties of composition D were not adversely affected by the incision of the high molecular weight polystyrene.

TABLE 2

| Component, wt % | A | B | C | D |
|---|---|---|---|---|
| Polyphenylene Ether | 32.3 | 32.2 | 32.2 | 32.2 |
| High Impact Polystyrene Resin | 52.8 | 52.5 | 50.0 | 48.3 |
| Flame Retardant | 12.8 | 12.7 | 12.7 | 12.7 |
| High Molecular Weight Polystyrene | — | — | 2.5 | 4.2 |
| Additives | 2.1 | 2.6 | 2.6 | 2.6 |
| UL 94 5V (.125" thick) | F-5 | F-5 | F-5 | PASS |
| IZOD IMPACT STRENGTH, ft-lbs/in | 4.0 | 4.2 | 3.8 | 3.9 |
| HDT, °F. | 155 | 154 | 156 | 156 |
| MOBAY VISCOSITY (550° F.) | | | | |
| 100 SEC.-1 | 3156 | 3132 | 3666 | 3227 |
| 500 SEC.-1 | 1484 | 1478 | 1668 | 1607 |
| 1000 SEC.-1 | 1072 | 1070 | 1188 | 1191 |
| TENSILE ST., PSI | 5460 | 5180 | 5180 | 5430 |
| MOD., PSI $\times 10^5$ | 3.5 | 3.6 | 3.5 | 3.4 |
| ELONG., % | 40 | 37 | 37 | 51 |

EXAMPLE 3

Polymer blend compositions according to the present invention were prepared, the components of which are set forth in weight percent in Table 3. Composition A of this Example did not include a high molecular weight polystyrene. The flame retardant comprised triphenyl phosphate while the high molecular weight polystyrene comprised the linear Celukavit S. Compositions A-C all included approximately 1 total weight percent of the aforementioned antioxidant, lubricant and phosphite stabilizer. Injection molded bars of the polymer blend compositions were subjected to the UL 94 5V test and to measurements of the notched Izod impact, Mobay viscosity and tensile strength, modulus and elongation as set forth in Example 1, the results of which are set forth in Table 3. The results in Table 3 also indicate that the physical properties of composition C were not adversely affected by the high molecular weight polystyrene resin.

TABLE 3

| Component, wt % | A | B | C |
| --- | --- | --- | --- |
| Polyphenylene Ether | 41.8 | 41.8 | 41.8 |
| High Impact Polystyrene Resin | 47.1 | 44.4 | 42.7 |
| Flame Retardant | 9.8 | 9.8 | 9.8 |
| High Molecular Weight Polystyrene | — | 2.7 | 4.4 |
| Additives | 1.3 | 1.3 | 1.3 |
| UL 94 5V (.125" thick) | F-4 | F-5 | Pass |
| Burn Time, sec. | dripped | dripped | 10 |
| IZOD IMPACT STRENGTH, ft-lbs/in | 5.0 | 5.2 | 5.3 |
| HDT, °F. | 184 | 186 | 190 |
| MOBAY VISCOSITY (550° F.) | | | |
| 100 SEC.-1 | 5024 | 5347 | 5409 |
| 500 SEC.-1 | 2450 | 2536 | 2667 |
| 1000 SEC.-1 | 1799 | 1944 | 1967 |
| TENSILE ST., PSI | 7415 | 7695 | 7850 |
| MOD., PSI × 10$^5$ | 3.5 | 3.5 | 3.6 |
| ELONG., % | 30 | 29 | 31 |

EXAMPLE 4

Polymer blend compositions were prepared in this Example according to the present invention, the amounts of the components of which are set forth in weight percents in Table 4. The flame retardant comprised triphenyl phosphate and the high molecular weight polystyrene comprised the linear Celukavit S. The compositions also included approximately 1 total weight percent of additives comprising the aforementioned antioxidant, a trinonylphenyl phosphite stabilizer and a magnesium oxide filler. Both solid and foamed samples of the polymer blend compositions were subjected to the UL 94 5V test. The foamed samples were prepared using a polyolefin blowing agent (Nortech 1226 supplied by Enron Chemical Company) and had a 10 percent weight reduction as compared with the solid samples. The results of the UL 94 5V tests are set forth in Table 4. These results indicate that the solid samples of the compositions according to the present invention, B-D, passed the UL 94 5V tests with burn times of 7, 8 and 10 seconds, respectively, while the solid sample of composition A not including the high molecular weight polystyrene failed the UL 94 5V test at the fifth ignition. Additionally, the foamed sample of composition D according to the present invention also passed the UL 94 5V test.

TABLE 4

| Component, wt % | A | B | C | D |
| --- | --- | --- | --- | --- |
| Polyphenylene Ether | 41.5 | 41.5 | 41.5 | 41.5 |
| High Impact Polystyrene Resin | 45.0 | 42.4 | 40.7 | 38.1 |
| Flame Retardant | 12.5 | 12.5 | 12.5 | 12.5 |
| High Molecular Weight Polystyrene | — | 2.6 | 4.3 | 6.9 |
| Additives | 1.0 | 1.0 | 1.0 | 1.0 |
| UL 94 5V, SOLID, (.150" thick) | F-5 | Pass | Pass | Pass |
| BURN TIME | dripped | 7 | 8 | 10 |
| UL 94 5V, FOAMED, (.150" thick) | F-5 | F-5 | F-5 | Pass |
| BURN TIME | dripped | dripped | dripped | 10 |

EXAMPLE 5

Polymer blend compositions were prepared in this Example according to the present invention, the components of which are set forth in weight percents in Table 5. The flame retardant included in these compositions comprised triphenyl phosphate. Composition A did not include a high molecular weight polystyrene resin. Compositions B-G included high molecular weight polystyrene resins comprising branched networks. These high molecular weight polystyrene resins were prepared by incorporating small amounts of di- or tri-functional monomers as the polystyrenes were formed. The functional monomer was added continuously at a low level in order to maintain an extremely low level of monomer during polymer synthesis. Compositions B-D included a high molecular weight polystyrene copolymer resin formed from 99.3 percent styrene monomer and 0.7 percent diallyl maleate monomer. The higher molecular weight polystyrene formed a gel in THF and toluene solvents so the approximate molecular weight could not be determined by liquid chromatography. Compositions E-G included a high molecular weight polystyrene copolymer resin prepared from 99.9 percent styrene monomer and 0.1 percent divinyl benzene monomer. The high molecular weight polystyrene copolymer resin had a weight average molecular weight, Mw, of approximately 670,000 as measured by liquid chromatography in toluene solution with linear polystyrene standards. The compositions of this Example also included approximately 1 weight percent of the additives set forth in Example 3. Injection molded bars of the compositions of this Example were subjected to the UL 94 5V test and to measurement of various physical properties, the results of which are set forth in Table 5. As may be observed from the results met forth in Table 5, comparative composition A not including a high molecular weight polystyrene did not pass the UL 94 5V test while compositions B-G according to the present invention successfully passed the UL 94 5V tests with burn times ranging from 9 to 14 seconds. The additional results set forth in Table 5 indicate that the physical properties of the compositions according to the present invention were not adversely affected by the high molecular weight polystyrene as compared with the properties of comparative composition A.

TABLE 5

| Component, wt % | A | B | C | D | E | F | G |
| --- | --- | --- | --- | --- | --- | --- | --- |
| Polyphenylene Ether | 41.8 | 41.8 | 41.8 | 41.8 | 41.8 | 41.8 | 41.8 |
| High Impact Polystyrene Resin | 47.1 | 45.3 | 44.4 | 43.5 | 44.4 | 43.5 | 42.7 |
| Flame Retardant | 9.8 | 9.8 | 9.8 | 9.8 | 9.8 | 9.8 | 9.8 |
| High Molecular Weight Polystyrene | — | 1.8 | 2.7 | 3.6 | 2.7 | 3.6 | 4.4 |
| Additives | 1.3 | 1.3 | 1.3 | 1.3 | 1.3 | 1.3 | 1.3 |
| UL 94 5V (.125" thick) | F-5 | Pass | Pass | Pass | Pass | Pass | Pass |
| Burn Time, sec. | dripped | 9 | 9 | 9 | 14 | 11 | 10 |
| IZOD IMPACT STRENGTH, ft-lbs/in | 4.7 | 4.6 | 4.9 | 4.5 | 4.9 | 4.5 | 4.6 |

TABLE 5-continued

| Component, wt % | A | B | C | D | E | F | G |
| --- | --- | --- | --- | --- | --- | --- | --- |
| MOBAY VISCOSITY (550° F.) | | | | | | | |
| 100 SEC.-1 | 5057 | 5108 | 4599 | 5081 | 4612 | 4875 | 5161 |
| 500 SEC.-1 | 2403 | 2542 | 2270 | 2555 | 2269 | 2464 | 2552 |
| 1000 SEC.-1 | 1744 | 1882 | 1675 | 1900 | 1671 | 1837 | 1884 |
| TENSILE ST., PSI | 7945 | 7967 | 7880 | 8250 | 7740 | 7915 | 8135 |
| MOD., PSI × $10^5$ | 3.3 | 3.2 | 3.4 | 3.4 | 3.4 | 3.4 | 3.5 |
| ELONG., % | 29 | 29 | 26 | 24 | 30 | 29 | 26 |

EXAMPLE 6

Polymer blend compositions were prepared in this Example according to the present invention, the components of which are set forth by weight percent in Table 6. The flame retardant included in the compositions of this Example comprised triphenyl phosphate. The high molecular weight polystyrene resin comprised a copolymer formed from 99.6 percent styrene monomer and 0.4 percent allyl methacrylate monomer. The high molecular weight polystyrene copolymer resin had a weight average molecular weight, Mw, of approximately 856,000 as measured by the chromatography techniques described in Example 5. The compositions of this Example also included approximately 1 total weight percent of the aforementioned antioxidant, lubricant and octyldiphenyl phosphite stabilizer. Injection molded bars of these polymer blend compositions were subjected to the UL 94 5V test and to measurements of various physical properties, the results of which are set forth in Table 6. As may be observed from Table 6, the compositions B-D according to the present invention passed the UL 94 5V tests with burn times of from 12 to 14 seconds while comparative composition A not including a high molecular weight polystyrene resin did not pass the UL 94 5V test. The remaining results set forth in Table 6 indicate that the various physical properties measured were not adversely affected by the inclusion of the high molecular weight polystyrene resins.

TABLE 6

| Component, wt % | A | B | C | D |
| --- | --- | --- | --- | --- |
| Polyphenylene Ether | 41.8 | 41.8 | 41.8 | 41.8 |
| High Impact Polystyrene Resin | 47.1 | 44.4 | 43.5 | 42.7 |
| Flame Retardant | 9.8 | 9.8 | 9.8 | 9.8 |
| High Molecular Weight Polystyrene | — | 2.7 | 3.6 | 4.4 |
| Additives | 1.3 | 1.3 | 1.3 | 1.3 |
| UL 94 5V (.125" thick) | F-5 | Pass | Pass | Pass |
| Burn Time, sec. | dripped | 14 | 12 | 13 |
| IZOD IMPACT STRENGTH, ft-lbs/in | 5.6 | 5.7 | 5.6 | 5.6 |
| HDT, °F. | 184 | 188 | 186 | 190 |
| MOBAY VISCOSITY (550° F.) | | | | |
| 100 SEC.-1 | 4914 | 5431 | 5767 | 5651 |
| 500 SEC.-1 | 2496 | 2721 | 2992 | 2771 |
| 1000 SEC.-1 | 1964 | 2021 | 3149 | 2038 |
| TENSILE ST., PSI | 7535 | 8090 | 8325 | 8375 |
| MOD., PSI × $10^5$ | 3.5 | 3.5 | 3.7 | 3.6 |
| ELONG., % | 32 | 27 | 26 | 27 |

The preceding Examples are set forth to illustrate specific embodiments of the invention and are not intended to limit the scope of the compositions of the present invention. Additional embodiments and advantages within the scope of the claimed invention will be apparent to one of ordinary skill in the art.

What is claimed is:

1. A polymer blend composition having improved flammability performance comprising:
    (a) a polyphenylene ether resin;
    (b) a high impact polystyrene resin wherein the polystyrene resin has a weight average molecular weight, Mw, of about 250,000 or less;
    (c) a flame retardant; and
    (d) a high molecular weight polystyrene resin having a weight average molecular weight, Mw, greater than about 600,000, and comprising a polystyrene homopolymer or a polystyrene copolymer formed from 0.1 to 0.7 weight percent of a nonstyrene di- or tri-functional monomer which provides a branched structure in the copolymer, said high molecular weight polystyrene resin being included in an amount sufficient to provide the blend composition with improved flammability performance.

2. A polymer blend composition as defined by claim 1, wherein the high molecular weight polystyrene resin is included in an amount sufficient to provide the blend composition with improved flammability as measured by any one of the oxygen index, UL 94 V and UL 94 5V tests.

3. A polymer blend composition as defined by claim 1, wherein the high molecular weight polystyrene resin is included in an amount less than the amount in which the high impact polystyrene resin is included.

4. A polymer blend composition as defined by claim 1, comprising:
    (a) from about 5 to about 90 weight percent of the polyphenylene ether resin;
    (b) from about 5 to about 90 weight percent of the high impact polystyrene resin;
    (c) from about 0.1 to about 30 weight percent of the flame retardant; and
    (d) from about 1 to about 10 weight percent of the high molecular weight polystyrene resin.

5. A polymer blend composition as defined by claim 4, comprising:
    (a) from about 25 to about 70 weight percent of the polyphenylene ether resin;
    (b) from about 25 to about 70 weight percent of the high impact polystyrene resin;
    (c) from about 1 to about 20 weight percent of the flame retardant; and
    (d) from about 3 to about 8 weight percent of the high molecular weight polystyrene resin.

6. A polymer blend composition as defined by claim 1, wherein the high molecular weight polystyrene resin comprises the polystyrene copolymer having a branched structure.

7. A polymer blend composition as defined by claim 6, wherein the high molecular weight polystyrene resin is included in an amount of at least 1 weight percent.

8. A polymer blend composition as defined by claim 7, wherein the high molecular weight polystyrene resin is included in an amount no greater than 10 weight percent.

9. A polymer blend composition as defined by claim 1, wherein the high molecular weight polystyrene resin comprises a linear polystyrene homopolymer.

10. A polymer blend composition as defined by claim 9, wherein the high molecular weight polystyrene resin is included in an amount of at least 3 weight percent.

11. A polymer blend composition as defined by claim 1, wherein the high impact polystyrene resin comprises an elastomeric impact modifier.

12. A polymer blend composition as defined by claim 1, wherein the high impact polystyrene resin comprises polystyrene and an impact modifier in a ratio of at least 3:1 by weight.

13. A polymer blend composition as defined by claim 1, wherein the flame retardant is selected from the group consisting of triarylphosphates and brominated aromatic compounds.

14. A polymer blend composition as defined by claim 1, wherein the polyphenylene ether resin comprises poly(2,6-dimethyl-1,4-phenylene) ether.

15. A polymer blend composition as defined by claim 16, wherein the flame retardant is selected from the group consisting of triphenyl phosphate and isopropyl triphenyl phosphate.

16. A polymer blend composition as defined by claim 1, wherein the di- or tri- functional monomer is selected from the group consisting of diallyl maleate, divinyl benzene and allyl methacrylate.

17. A polymer blend composition having improved flammability performance comprising:
 (a) a polyphenylene ether resin;
 (b) a high impact polystyrene resin wherein the polystyrene resin has a weight average molecular weight, Mw, of about 250,000 or less;
 (c) a flame retardant; and
 (d) a linear high molecular weight polystyrene resin having a weight average molecular weight, Mw, of approximately $6 \times 10^6$, said high molecular weight polystyrene resin being included in an amount sufficient to provide the blend composition with improved flammability performance.

* * * * *

UNITED STATES PATENT AND TRADEMARK OFFICE
CERTIFICATE OF CORRECTION

PATENT NO. : 5,143,955

DATED : September 1, 1992

INVENTOR(S) : KENDALL et al

It is certified that error appears in the above-identified patent and that said Letters Patent is hereby corrected as shown below:

On the title page, item [75], lines 2-3 please correct the name of the executrix as follows:

change "Karen Kendall" to --Janet O. D. Smith--.

Signed and Sealed this

Seventh Day of September, 1993

Attest:

BRUCE LEHMAN

Attesting Officer

Commissioner of Patents and Trademarks